United States Patent
Won et al.

(10) Patent No.: US 9,859,555 B2
(45) Date of Patent: Jan. 2, 2018

(54) POSITIVE ACTIVE MATERIAL, POSITIVE ELECTRODE, LITHIUM BATTERY INCLUDING THE SAME, AND METHOD OF MANUFACTURING THEREOF

(71) Applicant: Samsung SDI Co., Ltd., Yongin-si, Gyeonggi-do (KR)

(72) Inventors: Jung-Yeon Won, Yongin-si (KR); Eun-Young Goh, Yongin-si (KR); Jin-Hyon Lee, Yongin-si (KR); Ju-Hee Sohn, Yongin-si (KR); Jong-Ki Lee, Yongin-si (KR); Seung-Wan Kim, Yongin-si (KR); Ju-Hyeong Han, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 390 days.

(21) Appl. No.: 14/605,815

(22) Filed: Jan. 26, 2015

(65) Prior Publication Data

US 2015/0228973 A1  Aug. 13, 2015

(30) Foreign Application Priority Data

Feb. 7, 2014 (KR) .................. 10-2014-0014444

(51) Int. Cl.

| | |
|---|---|
| *H01M 4/36* | (2006.01) |
| *H01M 4/58* | (2010.01) |
| *H01M 4/525* | (2010.01) |
| *H01M 4/1391* | (2010.01) |
| *H01M 4/131* | (2010.01) |
| *C01G 53/00* | (2006.01) |
| *C01B 25/45* | (2006.01) |
| *H01M 4/02* | (2006.01) |
| *H01M 4/136* | (2010.01) |
| *H01M 4/1397* | (2010.01) |

(52) U.S. Cl.
CPC ............. *H01M 4/366* (2013.01); *C01B 25/45* (2013.01); *C01G 53/006* (2013.01); *C01G 53/42* (2013.01); *C01G 53/50* (2013.01); *H01M 4/131* (2013.01); *H01M 4/1391* (2013.01); *H01M 4/525* (2013.01); *H01M 4/5825* (2013.01); *C01P 2004/03* (2013.01); *C01P 2004/61* (2013.01); *C01P 2004/80* (2013.01); *H01M 4/136* (2013.01); *H01M 4/1397* (2013.01); *H01M 2004/021* (2013.01); *H01M 2004/028* (2013.01)

(58) Field of Classification Search
CPC .... H01M 4/366; H01M 4/5825; H01M 4/525; H01M 4/131; H01M 4/136; H01M 4/1391; H01M 4/1397; H01M 2004/021; H01M 2004/028; C01G 53/006; C01G 53/42; C01G 53/50; C01P 2004/03; C01P 2004/61; C01P 2004/80; C01B 25/45
See application file for complete search history.

(56) References Cited

U.S. PATENT DOCUMENTS

| | | | |
|---|---|---|---|
| 2010/0203388 A1 | 8/2010 | Kim et al. | |
| 2011/0052991 A1* | 3/2011 | Kim | H01M 4/366 |
| | | | 429/231 |

FOREIGN PATENT DOCUMENTS

| | | |
|---|---|---|
| JP | 2007-317539 A | 12/2007 |
| KR | 10-2004-0096203 A | 11/2004 |
| KR | 10-2005-0048452 A | 5/2005 |
| KR | 10-2009-0008870 A | 1/2009 |
| KR | 10-0889622 B1 | 3/2009 |
| KR | 10-2012-0113008 A | 10/2012 |

OTHER PUBLICATIONS

Kim et al. "Preparation and cycle performance at high temperature for Li[Ni0.5Co0.2Mn0.3]O2 coated with LiFePO4"; Journal of Solid State Electrochemistry (2010), 14(6), 919-922.*

* cited by examiner

*Primary Examiner* — Laura Weiner
(74) *Attorney, Agent, or Firm* — Knobbe Martens Olson & Bear LLP

(57) ABSTRACT

Provided is a positive active material, a positive electrode including the positive active material, a lithium battery, and a manufacturing method of the same. The positive active material includes a core including a lithium nickel composite oxide and a coating layer formed on the core. The coating layer improves structural stability of the positive active material. Accordingly, lifespan properties of a lithium battery including the positive active material may be improved.

16 Claims, 5 Drawing Sheets

POSITIVE ACTIVE MATERIAL, POSITIVE ELECTRODE, LITHIUM BATTERY INCLUDING THE SAME, AND METHOD OF MANUFACTURING THEREOF

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2014-0014444 filed in the Korean Intellectual Property Office on Feb. 7, 2014, the disclosure of which is incorporated herein in its entirety by reference.

BACKGROUND

Field

This disclosure relates to a positive active material, a positive electrode and a lithium battery including the positive active material, and a method of manufacturing the same.

Description of the Related Technology

With the advancement of small high tech devices such as digital cameras, mobile devices, notebook computers, and personal computers, demand for lithium secondary batteries, which are an energy source for the small high tech devices, has dramatically increased. Also, a stable lithium ion battery having high capacity is currently being developed for electric cars, which includes hybrid electric vehicles (HEV), plug-in hybrid electric vehicles (PHEV), and electric vehicles (EV).

Various positive active materials have been investigated to develop a lithium battery that is suitable for the purpose described above.

As a positive active material for a lithium secondary battery, a single-component lithium cobalt oxide ($LiCoO_2$) has been used; however, use of lithium composite metal oxide ($Li(Ni$—$Co$—$Mn)O_2$, $Li(Ni$—$Co$—$Al)O_2$, or the like) having a layer-structure and high capacity has been increasing. Also, a spinel-type lithium manganese oxide ($LiMn_2O_4$) and an olivine-type iron phosphate lithium oxide ($LiFePO_4$) having high safety are receiving attention.

In particular, research is being conducted to increase the amount of nickel included in the lithium composite metal oxide to increase capacity of a battery.

However, as the amount of nickel included in the lithium composite metal oxide increases, an amount of $Ni^{2+}$, which may substitute lithium site, increases, which facilitates the formation of NiO an impurity. NiO is highly reactive and thus, may react with an electrolyte and two or more NiOs may be connected to locally form a three dimensional structure preventing diffusion of lithium ions. As a result, structural stability of the battery degrades to decrease the capacity of the battery.

Accordingly, a method of improving charge and discharge efficiency and lifespan properties of a lithium battery by improving structural stability of a positive active material having high nickel content is needed.

SUMMARY

One aspect of the disclosure relates to a positive active material having improved structural stability by forming an island-type discontinuous coating layer including an olivine-type phosphate compound on a core surface including a lithium nickel composite oxide.

Another aspect of the disclosure relates to a positive electrode including the positive active material.

Additional aspect of the disclosure relates to a lithium battery having improved lifespan properties, including the positive electrode.

Additional aspect of the disclosure relates to a manufacturing method of the positive active material.

Additional aspects will be set forth in part in the description which follows and, in part, will be apparent from the description, or may be learned by practice of the presented embodiments.

According to one or more embodiments, provided is a positive active material including a core including a lithium nickel composite oxide; and a coating layer formed on the core, wherein the coating layer includes an olivine-type phosphate compound and is an island type discontinuous coating layer.

According to one or more embodiments, an amount of nickel in the lithium nickel composite oxide may be at least 70 mole % based on a total mole of metal atoms except lithium in the lithium nickel composite oxide.

In some embodiments, the amount of nickel in the lithium nickel composite oxide may be about 70 mole % to about 85 mole % based on the total mole of metal atoms except lithium in the lithium nickel composite oxide.

In some embodiments, the lithium nickel composite oxide may be represented by Formula 1:

$$Li_a(Ni_xM_y{'}M_z{''})O_2 \quad \text{Formula 1}$$

wherein M' may be at least one element selected from the group consisting of Co, Mn, Ni, Al, Mg, and Ti and M" is at least one element selected from the group consisting of Ca, Mg, Al, Ti, Sr, Fe, Co, Mn, Ni, Cu, Zn, Y, Zr, Nb, and B (boron), wherein $0<a\leq1$, $0.7\leq x\leq1$, $0\leq y\leq0.3$, $0\leq z\leq0.3$, and $x+y+z=1$.

According to one or more embodiments, the lithium nickel composite oxide may be represented by Formula 2:

$$Li_a(Ni_xCo_yMn_z)O_2 \quad \text{Formula 2}$$

wherein, $0<a\leq1$, $0.7\leq x\leq1$, $0\leq y\leq0.3$, $0\leq z\leq0.3$ and $x+y+z=1$.

According to one or more embodiments, the olivine-type phosphate compound may be $LiFePO_4$.

According to one or more embodiments, the core may be a one-body particle.

According to one or more embodiments, the core may be a secondary particle formed by aggregation of primary particles.

According to one or more embodiments, an average diameter of the core may be about 1 μm to about 100 μm.

According to one or more embodiments, an average diameter of particles of the olivine-type phosphate compound may be 1 μm or less. In some embodiments, the average diameter of particles of the olivine-type phosphate compound may be about 10 nm to about 1 μm.

According to one or more embodiments, an amount of the coating layer may be about 0.1 parts by weight to about 10 parts by weight, based on 100 parts by weight of the core.

According to one or more embodiments, an amount of the coating layer may be about 0.5 parts by weight to about 5 parts by weight, based on 100 parts by weight of the core.

According to one or more embodiments, provided is a positive electrode including the positive active material.

According to one or more embodiments, provided is a lithium battery including the positive electrode.

According to one or more embodiments, provided is a manufacturing method of the positive active material, the method including:

providing a core including a lithium nickel composite oxide; and performing a dry coating of nanoparticles including an olivine-type phosphate compound on the core to form an island-type discontinuous coating layer.

According to one or more embodiments, the dry coating may be performed by using a mechanofusion method, a planetary ball mill method, a low rotation ball mill method, a high rotation ball mill method, or a hybridization method.

According to one or more embodiments, the dry coating may be performed at a rotation speed of about 500 rpm to about 7,000 rpm.

According to one or more embodiments, a separate heat treatment process may not be performed after forming of the coating layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
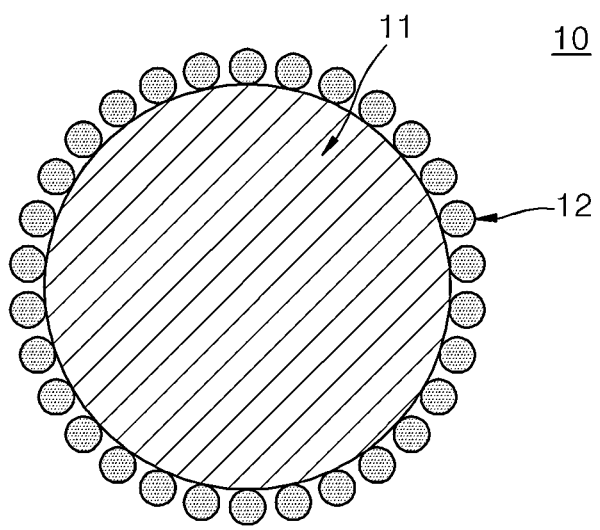
FIG. 1 is a schematic view of a structure of a positive active material according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the present embodiments will be described in greater detail.

Some embodiments provide a a positive active material including: a core that includes a lithium nickel composite oxide; and a coating layer formed on the core, wherein the coating layer includes an olivine-type phosphate compound and is an island type discontinuous coating layer.

FIG. 1 is a schematic view of a structure of a positive active material 10 according to an embodiment. As shown in FIG. 1, an island-type discontinuous coating layer 12 is formed on a core 11, which includes a lithium nickel composite oxide. In this regard, the wording "island" type refers to a spherical, semi-spherical, non-spherical, or amorphous shape having a certain volume, but the shape thereof is not particularly limited. As illustrated in FIG. 1, the island-type discontinuous coating layer 12 may have a shape in which spherical particles are discontinuously coated thereon or an irregular shape in which numerous particles are combined to have a certain volume. Also, the island-type discontinuous coating layer 12 is not a continuous layer in which particles are connected to each other without a boundary therebetween, but rather a discontinuous coating layer that does not completely cover the core 11.

Due to the island-type discontinuous coating layer 12 including the olivine-type phosphate compound, a side reaction between NiO formed by $Ni^{2+}$ of the lithium nickel composite oxide included in the core and an electrolyte may be inhibited. Accordingly, a local three dimensional structure of the NiO formed may prevent a decrease in capacity of the battery. Also, the olivine-type phosphate compound may intercalate and deintercalate lithium ions and has a very stable structure at a high temperature, such that thermal stability and structural stability of the positive active material may be improved without substantially decreasing unit capacity of the positive active material. Accordingly, stability and lifespan properties of a lithium battery including the positive active material may be improved.

Due to the formation of the island-type discontinuous coating layer 12 that prevents the side reaction with the electrolyte, an amount of nickel (Ni) that may increase capacity of the lithium nickel composite oxide may be large. According to an embodiment, an amount of Ni may be at least 70 mole % based on a total mole of metal atoms except lithium, which are included in the lithium nickel composite oxide. For example, the amount of Ni may be about 70 mole % to about 85 mole % based on the total mole of metal atoms except lithium, which are included in the lithium nickel composite oxide. Due to a large amount of Ni, the lithium battery including the positive active material may show high capacity.

In some embodiments, the lithium nickel composite oxide in the positive active material may be represented by Formula 1:

$$Li_a(Ni_xM_y'M_z'')O_2 \quad \text{Formula 1}$$

wherein in Formula 1, M' is at least one element selected from the group consisting of cobalt (Co), manganese (Mn), nickel (Ni), aluminum (Al), magnesium (Mg), and titanium (Ti), M" is at least one element selected from the group consisting of calcium (Ca), Mg, Al, Ti, strontium (Sr), iron (Fe), Co, Mn, Ni, copper (Cu), zinc (Zn), yttrium (Y), zirconium (Zr), niobium (Nb), and boron (B), $0<a\leq1$, $0.7\leq x\leq1$, $0\leq y\leq0.3$, $0\leq z\leq0.3$, and $x+y+z=1$.

For example, the lithium nickel composite oxide may be represented by Formula 2:

$$Li_a(Ni_xCo_yMn_z)O_2 \quad \text{Formula 2}$$

wherein in Formula 2, $0<a\leq1$, $0.7\leq x\leq1$, $0\leq y\leq0.3$, $0\leq z\leq0.3$, and $x+y+z=1$.

In some embodiments, a three-component based lithium nickel cobalt manganese oxide represented by Formula 2 may have various advantages such as high capacity of lithium nickel oxide, thermal stability and cost efficiency of lithium manganese oxide, and stable electrochemical properties of lithium cobalt oxide, which may be combined to achieve excellent battery properties. Also, when x is in the range described above, improvements in thermal stability and structural stability of the positive active material due to the coating layer including the olivine-type phosphate compound may be maximized.

In some embodiments, the core may further include a compound that is generally used as a positive active material in a lithium battery.

In some embodiments, the olivine-type phosphate compound in the positive active material may be represented by Formula 3:

$$LiMPO_4 \qquad \text{Formula 3}$$

wherein in Formula 3, M is at least one element from Fe, Mn, Ni, Co, and vanadium (V).

For example, the olivine-type phosphate compound may be $LiFePO_4$. With regards to the $LiFePO_4$, $FePO_4$, in which lithium ion is deintercalated, has a small structural change at a high temperature and is stable compared to most lithium salts and electrolytes. Accordingly, when the coating layer includes $LiFePO_4$, thermal stability and structural stability of the positive active material may be further improved.

In some embodiments, the core in the positive active material may be a one-body particle. In this regard, the wording "one-body particle" is distinguished from the term "agglomerate", which refers to a plurality of small particles that are aggregated due to a bonding therebetween. The one-body particle does not have a grain boundary and is formed of only one particle that exists alone. The core formed of the one-body particle has a reduced specific surface area which further inhibits a side reaction with the electrolyte.

In the positive active material, the core may not only be formed of the one-body particle, but may also be a secondary particle formed by an aggregation of primary particles. In some embodiments, the secondary particle may include holes and grain boundaries between the primary particles.

In some embodiments, an average diameter of the core in the positive active material may be about 1 μm to about 100 μm, for example, about 3 μm to about 50 μm, and in greater detail, about 6 μm to about 20 μm. When the average diameter of the core is in the range described above, a coating layer including an olivine-type phosphate compound may be effectively formed and efficiency and reproducibility of a coating process may be improved.

In some embodiments, an average diameter of the olivine-type phosphate compound in the positive active material may be 1 μm or less, for example, about 10 nm to about 500 nm, and in greater detail, about 10 nm to about 200 nm. When the average diameter of the olivine-type phosphate compound is in the range described above, a specific surface area of the olivine-type phosphate compound may reach a level at which the olivine-type phosphate compound does not simply mix with the core, but rather forms an island-type coating layer on a surface of the core.

The term average diameter as used herein refers to a particle size corresponding to 50%, $D_{50}$, when a total number of particles is 100% in an accumulated particle size distribution curve in which particles are sequentially accumulated in order of a particle having the smallest size to a particle having the largest size. $D_{50}$ may be measured by using widely known method, for example, a method using a particle size analyzer, or from TEM or SEM images. Alternatively, for example, after a measurement apparatus using dynamic light-scattering is used, data analysis is performed to count the number of particles each of the size ranges, and from results obtained due to the data analysis, $D_{50}$ may be obtained.

In some embodiments, an amount of the coating layer in the positive active material may be about 0.1 parts by weight to about 10 parts by weight based on 100 parts by weight of the core, for example about 0.5 parts by weight to about 5 parts by weight. When the amount of the coating layer is in the range described above, the amount of the coating layer may be sufficient to form the island-type discontinuous coating layer on the core to prevent a side reaction with an electrolyte. Also, an amount of lithium nickel composite oxide included in the core in the positive active material may be procured that is sufficient enough to prevent a decrease in capacity of the positive active material. Accordingly, the positive active material in which the amount of the coating layer is in the range described above may have capacity above a certain level to improve thermal stability and structural stability at the same time.

In some embodiments, the positive active material may further include a general positive active material which has at least one other technical characteristic, such as composition and diameter, and is known in the art, in addition to the positive active material.

In some embodiments, the positive active material may be any lithium-containing metal oxide that is generally used in the art. For example, the positive active material may be at least one composite oxide of lithium and a metal selected from cobalt, manganese, nickel, and a combination thereof and, in greater detail, may include a compound represented by any one of formulae: $Li_aA_{1-b}B^1{}_bD^1{}_2$ (wherein, $0.90\leq a\leq1$, and $0\leq b\leq0.5$); $Li_aE_{1-b}B^1{}_bO_{2-c}D^1{}_c$ (wherein, $0.90\leq a\leq1$, $0\leq b\leq0.5$, and $0\leq c\leq0.05$); $LiE_{2-b}B^1{}_bO_{4-c}D^1{}_c$ (wherein, $0\leq b\leq0.5$ and $0\leq c\leq0.05$); $Li_aNi_{1-b-c}Co_bB^1{}_cD^1{}_\alpha$ (wherein, $0.90\leq a\leq1$, $0\leq b\leq0.5$, $0\leq c\leq0.05$, and $0<\alpha\leq2$); $Li_aNi_{1-b-c}Co_bB^1{}_cO_{2-\alpha}F^1{}_\alpha$ (wherein, $0.90\leq a\leq1$, $0\leq b\leq0.5$, $0\leq c\leq0.05$, and $0<\alpha<2$); $Li_aNi_{1-b-c}Co_bB^1{}_cO_{2-\alpha}F^1{}_2$ (wherein, $0.90\leq a\leq1$, $0\leq b\leq0.5$, $0\leq c\leq0.05$, and $0<\alpha<2$); $Li_aNi_{1-b-c}Mn_bB^1{}_cD^1{}_\alpha$ (wherein, $0.90\leq a\leq1$, $0\leq b\leq0.5$, $0\leq c\leq0.05$, and $0<\alpha\leq2$); $Li_aNi_{1-b-c}Mn_bB^1{}_cO_{2-\alpha}F^1{}_\alpha$ (wherein, $0.90\leq a\leq1$, $0\leq b\leq0.5$, $0\leq c\leq0.05$, and $0<\alpha<2$); $Li_aNi_{1-b-c}Mn_bB^1{}_cO_{2-\alpha}F^1{}_2$ (wherein, $0.90\leq a\leq1$, $0\leq b\leq0.5$, $0\leq c\leq0.05$, and $0<\alpha<2$); $Li_aNi_bE_cG_dO_2$ (wherein, $0.90\leq a\leq1$, $0\leq b\leq0.9$, $0\leq c\leq0.5$, and $0.001\leq d\leq0.1$.); $Li_aNi_bCo_cMn_dGeO_2$ (wherein, $0.90\leq a\leq1$, $0\leq b\leq0.9$, $0\leq c\leq0.5$, $0\leq d\leq0.5$, and $0.001\leq e\leq0.1$.); $Li_aNiG_bO_2$ (wherein, $0.90\leq a\leq1$, and $0.001\leq b\leq0.1$.); $Li_aCoG_bO_2$ (wherein, $0.90\leq a\leq1$ and $0.001\leq b\leq0.1$.); $Li_aMnG_bO_2$ (wherein, $0.90\leq a\leq1$ and $0.001\leq b\leq0.1$.); $Li_aMn_2G_bO_4$ (wherein, $0.90\leq a\leq1$ and $0.001\leq b\leq0.1$.); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0\leq f\leq2$); $Li_{(3-f)}Fe_2(PO_4)_3$ ($0\leq f\leq2$); and $LiFePO_4$.

In the formulae above, A is Ni, Co, Mn, or a combination thereof; $B^1$ is Al, Ni, Co, Mn, Cr, Fe, Mg, Sr, V, a rare earth metal element, or a combination thereof; $D^1$ is oxygen (O), fluorine (F), sulfur (S), phosphorus (P), or a combination thereof; E is Co, Mn, or a combination thereof; $F^1$ is fluorine (F), sulfur (S), phosphorus (P), or a combination thereof; G is Al, Cr, Mn, Fe, Mg, lanthanum (La), cerium (Ce), Sr, V, or a combination thereof; Q is Ti, molybdenum (Mo), Mn, or a combination thereof; I$^1$ is Cr, V, Fe, Sc, Y, or a combination thereof; and J is V, Cr, Mn, Co, Ni, Cu, or a combination thereof.

For example, the positive active material may be one of LiCoO$_2$, LiMn$_x$O$_{2x}$ (x=1, 2), LiNi$_{1-x}$Mn$_x$O$_{2x}$ (0<x<1), LiNi$_{1-x-y}$Co$_x$Mn$_y$O$_2$ (0≤x≤0.5, 0≤y≤0.5), and FePO$_4$.

In some embodiments, the compounds may have a coating layer formed thereon, or may be mixed with a compound having a coating layer. In some embodiments, the coating layer may include a coating element compound, such as an oxide of a coating element, a hydroxide of a coating element, an oxyhydroxide of a coating element, an oxycarbonate of a coating element, or a hydroxycarbonate of a coating element. In some embodiments, the compounds that form the coating layer may be amorphous or crystalline. As a coating element included in the coating layer, Mg, Al, Co, K, Na, Ca, Si, Ti, V, Sn, germanium (Ge), gallium (Ga), B, arsenic (As), Zr, or a mixture thereof may be used. The coating layer may be formed by using any one of various coating methods that are performed using the compounds and the elements and do not affect properties of the positive active material (for example, spray coating, immersion, or the like).

Hereinafter, a manufacturing method of the positive active material according to another embodiment is described below.

According to an embodiment, the manufacturing method of the positive active material includes: providing a core including a lithium nickel composite oxide; and performing a dry coating of nanoparticles including an olivine-type phosphate compound on the core to form an island-type discontinuous coating layer.

In some embodiments, the lithium nickel composite oxide may be prepared by calcining a nickel metal hydroxide and a lithium salt. In some embodiments, the lithium nickel composite oxide may be prepared by continuously adding an aqueous solution including a nickel-containing salt and a salt containing a desired metal in a co-precipitation environment, according to a desired positive active material composition to prepare a mixture; washing, filtering, and drying the mixture to prepare a nickel metal hydroxide; and mixing the nickel metal hydroxide with a lithium salt and calcining the mixture under general calcination conditions to prepare a lithium nickel composite oxide. However, the method is not limited thereto and the lithium nickel composite oxide may be manufactured by any general method used in the art.

Unlike wet coating, the dry coating includes applying mechanical energy to the core to form the coating layer.

In some embodiments, the wet coating includes immersing the core in a solvent in which nanoparticles are dissolved or dispersed, or spraying the solvent onto the core and then drying the same to remove the solvent. The wet coating requires pulverization and a drying process, which thereby removes a conductive film formed on the core surface to decrease conductivity of the core.

Meanwhile, the dry coating method does not separately require a solvent and thus, the dry coating method may not include a drying process. Also, pulverization and coating may occur simultaneously due to mechanical energy to maintain sphericity of the core and form a coating layer on the core.

In some embodiments, the dry coating method includes a) immobilizing nanoparticles to a core surface by applying a force to the nanoparticles which is generated due to movement of a grinding medium or a rotor in a device and/or stress applying to nanoparticles to mechanically bind the nanoparticles to the core surface, or softening or melting the core and the nanoparticles by using heat generated from the stress to bind the same, b) contacting the nanoparticles with the core surface by using a low rotation ball mill or the like, such that the nanoparticles attach to the core surface and that the nanoparticles that are attached aggregate to form a coating layer, or heat treating the core having the coating layer formed by a) and/or b) to melt some portions or all of the core and the coating layer and then cooling the same, but the method is not limited thereto and any dry method used in the art may be used.

For example, the dry coating may be performed by a mechanofusion method, a planetary ball mill method, a low rotation ball mill method, a high rotation ball mill method, or a hybridization method.

In some embodiments, the dry coating may be performed at a rotation speed of about 500 rpm to about 7,000 rpm. When the dry coating is performed at a rotation speed in the range above, the core and the nanoparticles may not be simply mixed, but rather may form a coating layer including island-type nanoparticles on the core.

In some embodiments, the dry coating may be performed for suitable amount of time and under other conditions suitable for obtaining a product thereof that is more than a simple mixture and a continuous coating layer formed on the core. For example, the dry coating may be performed for about 1 minute to about 30 minutes at a rotation speed in the range above to form an island-type coating layer on the core.

For example, the dry coating may be performed by a mechanofusion method, wherein the mechanofusion method corresponds to a) in the dry coating method described above. In some embodiments, the mechanofusion method includes adding the core and the nanoparticles to a rotating container, immobilizing the nanoparticles by applying a centrifugal force to an internal wall of the container, and pressurizing the the core and the nanoparticles which pass through a narrow gap between the internal wall of the container and a press-head that is located next to the internal wall.

In some embodiments, a manufacturing method of the positive active material by using the dry coating method through the mechanofusion method includes: adding the core and nanoparticles including the olivine-type phosphate compound into a rotating container; pushing the core and the nanoparticles to an internal wall of the rotating container by using a centrifugal force generated by the rotating rotor; passing the core and the nanoparticles through a space between the press-head and the internal wall of the rotating container; and repeating the processes described above to attach the nanoparticles to the core to form the island-type coating layer on the core.

When the core and the nanoparticles pass through the gap between the press-head and the internal wall of the rotating container, shearing force, impact force, and pressure force generated due to particle-to-particle and particle-to-wall collisions are applied to the core and the nanoparticles. As a result, disintegration of the nanoparticles and spheroidization of the core may occur simultaneously to effectively form the island-type discontinuous coating layer on the core.

In some embodiments, the manufacturing method of the positive active material may not include a separate heat treatment process after the forming of the coating layer. Even when the dry coating method does not include the separate heat treatment process, energy and heat generated from the shearing force, impact force, and pressure force may be sufficiently delivered to the core and the nanoparticles, such that the nanoparticles may be effectively attached to the core. Furthermore, the heat treatment process may not be performed to prevent excessive aggregation of the nanoparticles due to calcination, and an island-type coating layer having a uniform gap on the core may be formed.

A positive electrode according to another embodiment includes the positive active material.

In some embodiments, the positive electrode may, for example, be manufactured by mixing the positive active material, a binder, and optionally a conductor in a solvent to prepare a positive active material composition, which may then be molded into a certain shape or spread on a current collector such as aluminum.

The binder used in the positive active material composition is a component that facilitates binding of the positive active material to the conductor and binding of the positive active material to the current collector, and the binder is added in an amount of about 1 part by weight to about 50 parts by weight based on 100 parts by weight of the positive active material. For example, the binder may be added in an amount of 1 part by weight to about 30 parts by weight, about 1 part by weight to about 20 parts by weight, or about 1 part by weight to about 15 parts by weight based on 100 parts by weight of the positive active material. The binder may be selected from polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile-butadiene-styrene, phenolic resin, epoxy resin, polyethylene terephthalate, polytetrafluoroethylene, polyphenylene sulfide, polyamide-imide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluororubber, or a combination thereof, but the binder is not limited thereto.

The positive electrode provides a conductive pathway to the positive active material and may selectively further include a conductor that may improve electrical conductivity. The conductor may be any conductor generally used in a lithium battery and examples thereof include carbonaceous materials such as carbon black, acetylene black, Ketjen black, carbon fiber, or the like; metallic materials such as a metal powder or metal fiber of copper, nickel, aluminum, or silver; conductive polymers such as polyphenylene derivatives, or a mixture thereof. An amount of the conductor may be appropriately controlled. For example, the conductor may be added in such an amount that a weight ratio of the negative active material to the conductor is in a range of about 99:1 to about 90:10.

In some embodiments, the solvent may be N-methylpyrrolidone (NMP), acetone, water, or the like. In some embodiments, an amount of the solvent may be about 1 part by weight to about 40 parts by weight based on 100 parts by weight of the positive active material. When the amount of the solvent is in the range described above, a process for forming an active material layer may be easy.

Also, the current collector may typically be formed to have a thickness of about 3 μm to about 500 μm. The current collector is not particularly limited as long as the current collector does not cause a chemical change in a battery and has conductivity. Examples of a material that forms the current collector are copper, stainless steel, aluminum, nickel, titanium, calcined carbon, copper and stainless steel that are surface-treated with carbon, nickel, titanium, silver, or the like, an alloy of aluminum and cadmium, etc. Also, an uneven microstructure may be formed on the surface of the current collector to enhance a binding strength of the negative active material. Also, the current collector may be used in various forms including a film, a sheet, a foil, a net, a porous structure, a foaming structure, a non-woven structure, etc.

In some embodiments, the aluminum current collector may be directly coated with a positive active material composition and then dried to prepare a positive electrode plate. In some embodiments, the positive active material composition may be cast on a separate support and then a positive active material film peeled off from the support may be used to laminate the aluminum current collector to manufacture a positive electrode plate. However, the positive electrode is not limited to the above and may have a shape other than the shape described above.

A lithium battery according to another embodiment includes a positive electrode including the positive active material. In some embodiments, the lithium battery includes a positive electrode including the positive active material; a negative electrode disposed opposite to the positive electrode; and a separator disposed between the positive electrode and the negative electrode; and an electrolyte. In some embodiments, the lithium battery may be manufactured according to the following method.

First, a positive electrode is manufactured according to the manufacturing method of the positive electrode.

Then, the negative electrode may be manufactured as follows. The negative electrode may be manufactured in the same manner as in the manufacture of the positive electrode, except that a negative active material is used instead of the positive active material. Also, in the negative active material composition, a binder, a conductor, and a solvent may be the same as those used in the positive electrode.

For example, the negative active material, the binder, the conductor, and the solvent may be mixed to prepare a negative active material composition, which may then be used to directly coat a copper current collector to manufacture a negative electrode plate. Alternatively, the negative active material composition may be cast on a separate support, and a negative active material film peeled off therefrom may be used to laminate the copper current collector to manufacture the negative electrode plate.

The negative active material may be any material that may be used as a negative active material for a lithium battery in the art. For example, the negative active material may be at least one selected from the group consisting of a lithium metal, a metal alloyable with lithium, a transition metal oxide, a non-transition metal oxide, and a carbonaceous material.

For example, the metal alloyable with lithium may be Si, Sn, Al, Ge, Pb, Bi, Sb, Si—Y alloy (wherein, Y is an alkali metal, an alkaline earth metal, a Group 13 element, a Group 14 element, a transition metal, a rare earth metal element, or a combination element thereof, but not Si), Sn—Y alloy (wherein, Y is an alkali metal, an alkaline earth metal, a Group 13 element, a Group 14 element, a transition metal, a rare earth metal element, or a combination element thereof, but not Sn). In some embodiments, the element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po) or a combination thereof.

For example, the transition metal oxide may be a lithium titanium oxide, a vanadium oxide, a lithium vanadium oxide, or the like.

For example, the non-transition metal oxide may be $SnO_2$, $SiO_x$ ($0<x<2$), or the like.

In some embodiments, the carbonaceous material may be a crystalline carbon, an amorphous carbon, or a combination thereof. Examples of the crystalline carbon include graphite such as natural graphite or synthetic graphite having an amorphous, flat, flake, spherical, or fiber shape, and examples of the amorphous carbon include soft carbon or hard carbon, mesophase pitch carbide, or calcined coke.

Then, a separator to be disposed between the positive electrode and the negative electrode is prepared. The separator may be any separator that is generally used in a lithium battery. For example, the separator may include a material that has a low resistance to migration of ions of an electrolyte and an excellent electrolytic solution-retaining capability. For example, the separator may include a material selected from the group consisting of glass fiber, polyester, Teflon, polyethylene, polypropylene, polytetrafluoroethylene (PTFE), and a combination thereof, each of which may be nonwoven or woven. In some embodiments, the separator may have a pore size of about 0.01 μm to about 10 μm and a thickness of about 5 μm to about 300 μm.

In some embodiments, the electrolyte may include a non-aqueous electrolyte and a lithium salt. Examples of the non-aqueous electrolyte are a non-aqueous electrolytic solution, an organic solid electrolyte, an inorganic solid electrolyte, etc.

As the non-aqueous electrolytic solution, an aprotic organic solvent may be used, and examples of the aprotic organic solvent are N-methyl-2-pyrrolidone, propylene carbonate, ethylene carbonate (EC), butylene carbonate (BC), dimethyl carbonate (DMC), diethyl carbonate (DEC), ethyl methyl carbonate (EMC) gamma-butyrolactone (GBL), 1,2-dimethoxy ethane (DME), tetrahydrofuran (THF), 2-methyltetrahydrofuran, dimethyl sulfoxide (DMSO), 1,3-dioxolane (DOL), formamide, dimethylformamide, acetonitrile, nitromethane, methyl formic acid, methyl acetic acid, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionic acid, ethyl propionic acid, etc.

Examples of the organic solid electrolyte are polyethylene derivatives, polyethylene oxide derivatives, polypropylene oxide derivatives, phosphate ester polymer, polyagitation lysine, polyester sulfide, polyvinyl alcohol, vinylidene polyfluoride, a polymer having an ionic dissociable group, etc.

Examples of the inorganic solid electrolyte are nitrides, halides, and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt may be any one of various lithium salts that are used in a lithium battery. As a material that may be dissolved well in the non-aqueous electrolyte, for example, one or more of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithiumchloroborate, lower aliphatic carbonic acid lithium, 4 phenyl boric acid lithium, lithium imide, etc may be used.

Also, to improve charge and discharge characteristics and fire retardancy of the battery, pyridine, triethyl phosphite, triethanolamine, cyclic ether, ethylenediamine, n-glyme, hexamethyl phosphoric acid triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, and aluminum trichloride may be added to the electrolyte.

Optionally, a halogen-containing solvent such as carbon tetrachloride and ethylene trifluoride may be further added to provide incombustibility, carbon dioxide gas may be added to improve high temperature maintenance properties, and fluoroethylene carbonate (FEC), propene sultone, or the like may be further added to the electrolyte.

For example, lithium salts such as $LiPF_6$, $LiClO_4$, $LiBF_4$, and $LiN(SO_2CF_3)_2$ may be added to a mixture solvent of a cyclic carbonate of EC or PC, which is a highly dielectric solvent, and a linear carbonate of DEC, DMC, or EMC, which is a low viscosity solvent to manufacture an electrolyte.

Figure 2:
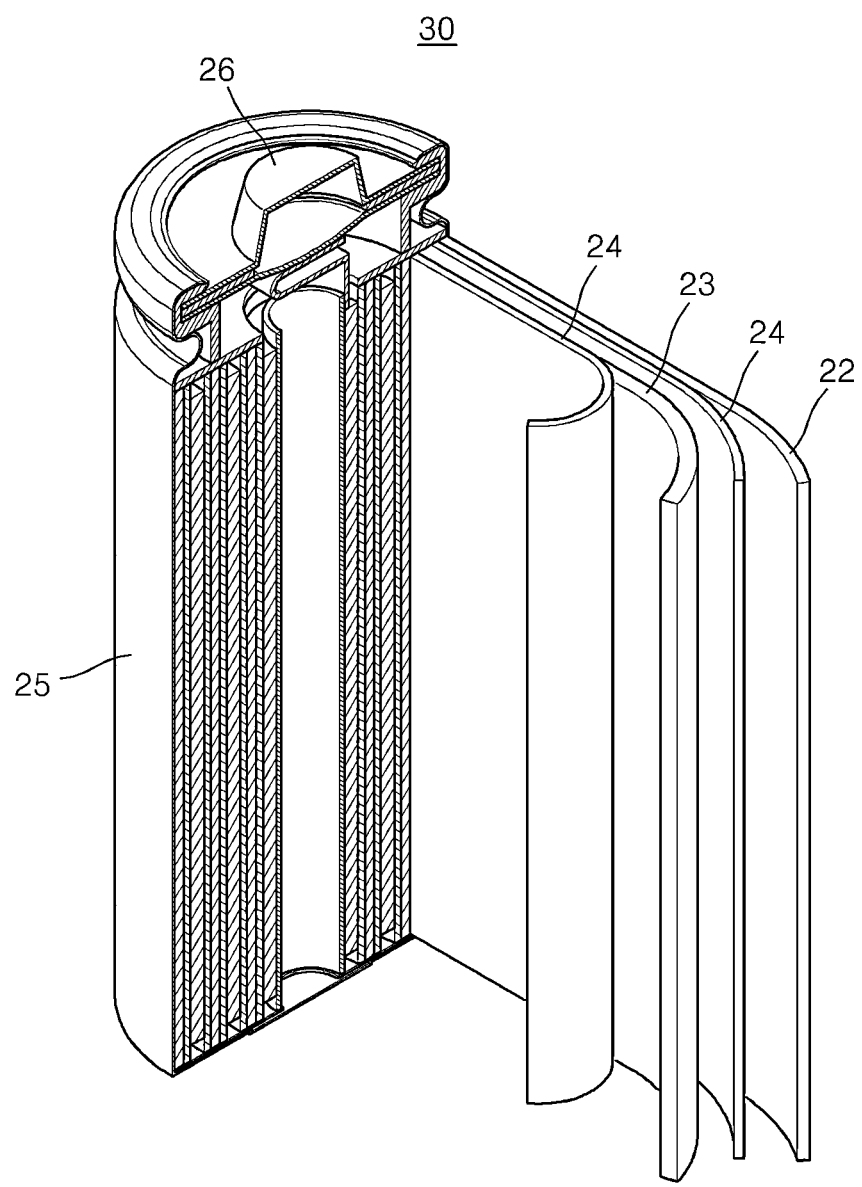
FIG. 2 is a schematic cross-sectional view of a lithium battery according to an embodiment.

FIG. 2 is a schematic cross-sectional view of a lithium battery according to an embodiment.

Referring to FIG. 2, the lithium battery 30 includes a positive electrode 23, a negative electrode 22, and a separator 24 interposed between the positive and negative electrodes 22 and 23. Also, the separator 24 may be further included on an external surface of the positive electrode 23 or the negative electrode 22 to prevent internal short circuits. In some embodiments, the positive electrode 23, the negative electrode 22, and the separator 24 are wound or folded to be housed in a battery case 25. Then, an electrolyte is injected into the battery case 25, followed by sealing the battery case 25 with an encapsulation member 26 to manufacture the lithium battery 30. In some embodiments, the battery case 25 may be a cylindrical, rectangular, or thin film type case. In some embodiments, the lithium battery 30 may be a lithium ion battery.

The lithium battery may not only be used as a power source of a small device of a battery, but also as a unit battery of a battery module for a medium to large-sized device, which includes a plurality of unit batteries.

Examples of the battery module for a medium to large-sized device include a power tool; xEVs including an electric vehicle (EV), a hybrid electric vehicle (HEV), and a plug-in hybrid electric vehicle (PHEV); electric motorcycles including an E-bike and an E-scooter; an electric golf cart; an electric truck; an electric commercial vehicle; or an electric power storage system, but the large-sized battery module device is not limited thereto. Furthermore, the lithium battery may be used in any device requiring a high capacity battery, a high-power output, and high temperature operability.

Hereinafter, exemplary embodiments will be described in detail with reference to examples and comparative examples. However, the examples are illustrated for illustrative purpose only and do not limit the scope of the embodiments.

Manufacturing a Lithium Nickel Composite Oxide

Manufacturing Example 1: Manufacturing $Li[Ni_{0.85}Co_{0.10}Mn_{0.05}]O_2$

Nickel sulfate ($NiSO_4.6H_2O$), which is a nickel derivative, cobalt sulfate ($CoSO_4.7H_2O$), which is a cobalt derivative, and manganese sulfate ($MnSO_4 \cdot H_2O$), which is a manganese derivative were added to water such that a molar ratio of nickel, cobalt, and manganese was 0.85:0.10:0.05 to prepare a precursor aqueous solution. While stirring the aqueous solution, sodium hydroxide aqueous solution was slowly added thereto in a drop-wise manner to neutralize the precursor aqueous solution, to thereby precipitate $Ni_{0.85}Co_{0.10}Mn_{0.05}(OH)_2$, which is a nickel metal hydroxide. The precipitate was filtered, washed, and then dried at a temperature of 80° C. to prepare $Ni_{0.85}Co_{0.10}Mn_{0.05}(OH)_2$ powder.

The $Ni_{0.85}Co_{0.10}Mn_{0.05}(OH)_2$ powder and $Li_2CO_3$, which is a lithium precursor, were prepared at a molar ratio of 1:0.5.

The $Ni_{0.85}Co_{0.10}Mn_{0.05}(OH)_2$ powder and the lithium precursor were mixed and inserted into a furnace and then dry air was flowed thereto while calcining the same at a temperature of 1000° C. for 20 hours to prepare a lithium nickel composite oxide.

The lithium nickel composite oxide was represented by a formula of $Li[Ni_{0.85}Co_{0.10}Mn_{0.05}]O_2$ powder, which had an average diameter of 6 μm and had a secondary particle shape in which primary particles were aggregated.

Comparative Manufacturing Example 1: Preparing $Li[Ni_{0.5}Co_{0.2}Mn_{0.3}]O_2$ Nickel sulfate ($NiSO_4 \cdot 6H_2O$), which is a nickel derivative, cobalt sulfate ($CoSO_4 \cdot 7H_2O$), which is a cobalt derivative, and manganese sulfate ($MnSO_4 \cdot H_2O$), which is a manganese derivative were added to water such that a molar ratio of nickel, cobalt, and manganese was 0.5:0.2:0.3, to prepare a precursor aqueous solution. While stirring the aqueous solution, sodium hydroxide aqueous solution was slowly added thereto in a drop-wise manner to neutralize the precursor aqueous solution, to thereby precipitate $Ni_{0.5}Co_{0.2}Mn_{0.3}(OH)_2$, which is a nickel metal hydroxide. The precipitate was filtered, washed, and then dried at a temperature of 80° C. to prepare the $Ni_{0.5}Co_{0.2}Mn_{0.3}(OH)_2$ powder.

The $Ni_{0.5}Co_{0.2}Mn_{0.3}(OH)_2$ powder and $Li_2CO_3$, which is a lithium precursor, were prepared at a molar ratio of 1:0.5.

The $Ni_{0.5}Co_{0.2}Mn_{0.3}(OH)_2$ powder and the lithium precursor were mixed and inserted into a furnace and then dry air was flowed thereto while calcining the same at a temperature of 1000° C. for 20 hours to prepare a lithium nickel composite oxide.

The lithium nickel composite oxide was represented by a formula of $Li[Ni_{0.5}Co_{0.2}Mn_{0.3}]O_2$ powder, which had an average diameter of 6 μm and had a secondary particle shape in which primary particles were aggregated.

Preparing a Positive Active Material

Example 1: Preparing a Positive Active Material in Which an $LiFePO_4$ Coating Layer is Formed on a Core The $Li[Ni_{0.85}Co_{0.10}Mn_{0.05}]O_2$ powder having an average diameter of 6 μm manufactured in Manufacturing Example 1 and $LiFePO_4$ particles having an average diameter of 200 nm were prepared. In a dry coating apparatus (Hosokawa Micron Corporation, Osaka Japan, Mechanofusion device, Nobilta-mini), 100 parts by weight of the $Li[Ni_{0.85}Co_{0.10}Mn_{0.05}]O_2$ powder and 0.5 parts by weight of the $LiFePO_4$ particles were added and then treated at 3,000 rpm for 5 minutes to prepare a positive active material in which a coating layer including $LiFePO_4$ was formed on an $Li[Ni_{0.85}Co_{0.10}Mn_{0.05}]O_2$ core. The coating layer was an island-type discontinuous coating layer.

Figure 3A:
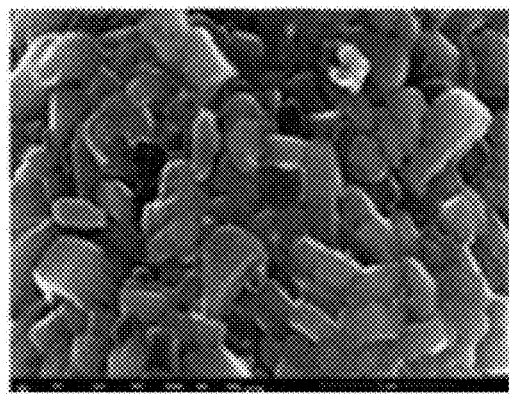
FIG. 3A is a scanning electron microscope (SEM) image of the positive active material manufactured in Example 2, measured at 80,000×.

Example 2: Preparing a Positive Active Material in Which an $LiFePO_4$ Coating Layer is Formed on a Core A positive active material was manufactured in the same manner as in Example 1, except that the amount of $LiFePO_4$ particles added was changed to 1 part by weight. FIG. 3A shows a scanning electron microscope (SEM) image of the manufactured positive active material.

Figure 3B:
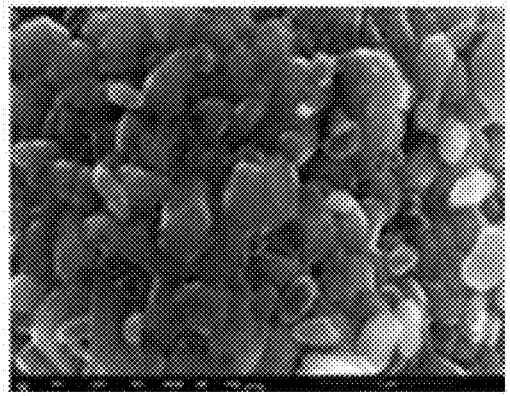
FIG. 3B is a scanning electron microscope (SEM) image of the positive active material manufactured in Example 3, measured at 80,000×.

Example 3: Preparing a Positive Active Material in Which an $LiFePO_4$ Coating Layer is Formed on a Core A positive active material was manufactured in the same manner as in Example 1, except that the amount of $LiFePO_4$ particles added was changed to 3 parts by weight. FIG. 3B shows a scanning electron microscope (SEM) image of the manufactured positive active material.

Figure 3C:
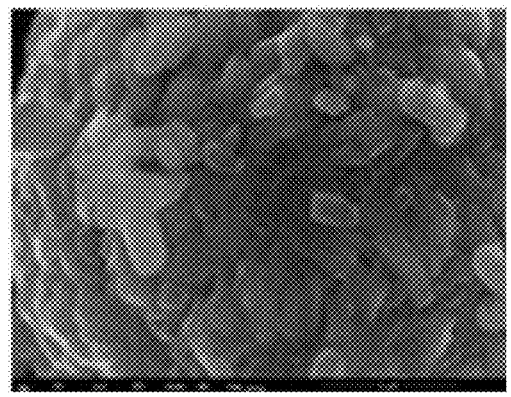
FIG. 3C is a scanning electron microscope (SEM) image of the positive active material manufactured in Example 4, measured at 80,000×.

Example 4: Preparing a Positive Active Material in Which an $LiFePO_4$ Coating Layer is Formed on a Core A positive active material was manufactured in the same manner_as in Example 1, except that the amount of $LiFePO_4$ particles added was changed to 5 parts by weight. FIG. 3C shows a scanning electron microscope (SEM) image of the manufactured positive active material.

Comparative Example 1: Preparing a Positive Active Material in Which a Coating Layer is not Formed Without any coating layer formation process, the $Li[Ni_{0.85}Co_{0.10}Mn_{0.05}]O_2$ powder having an average diameter of 6 μm manufactured in Manufacturing Example 1 was used as a positive active material.

Comparative Example 2: A Positive Active Material in Which an Excessive Amount of the $LiFePO_4$ Coating Layer is Formed on a Core A positive active material was manufactured in the same manner as in Example 1, except that the amount of $LiFePO_4$ particles added was changed to 15 parts by weight.

Comparative Example 3: Preparing a Positive Active Material in Which a Coating Layer is not Formed on the Core Manufactured in Comparative Manufacturing Example 1

Without any coating layer formation process, the $Li[Ni_{0.5}Co_{0.3}Mn_{0.2}]O_2$ powder having an average diameter of 6 μm manufactured in Comparative Manufacturing Example 1 was used as a positive active material.

Comparative Example 4: Preparing a Positive Active Material in Which an $LiFePO_4$ Coating Layer is Formed on the Core Manufactured in Comparative Manufacturing Example 1

The $Li[Ni_{0.5}Co_{0.3}Mn_{0.2}]O_2$ powder having an average diameter of 6 μm manufactured in Comparative Manufacturing Example 1 and LiFePO$_4$ particles having an average diameter of 200 nm were prepared. In a dry coating apparatus (Hosokawa Micron Corporation, Japan, Mechanofusion device, Nobilta-mini), 100 parts by weight of the Li[Ni$_{0.5}$Co$_{0.3}$Mn$_{0.2}$]O$_2$ powder and 5 parts by weight of the LiFePO$_4$ particles were added and then treated at 3,000 rpm for 5 minutes to prepare a positive active material in which a coating layer including LiFePO$_4$ was formed on an Li[Ni$_{0.5}$Co$_{0.3}$Mn$_{0.2}$]O$_2$ core.

Comparative Example 5: Manufacturing a Positive Active Material in Which a Continuous Coating Layer is Formed on a Core The Li[Ni$_{0.85}$Co$_{0.10}$Mn$_{0.05}$]O$_2$ powder having an average diameter of 6 μm manufactured in Manufacturing Example 1 and LiFePO$_4$ particles having an average diameter of 200 nm were prepared. In a dry coating apparatus (Hosokawa Micron Corporation, Japan, Mechanofusion device, Nobilta-mini), 100 parts by weight of the Li[Ni$_{0.85}$Co$_{0.10}$Mn$_{0.05}$]O$_2$ powder and 0.5 parts by weight of the LiFePO$_4$ particles were added first and then treated at 3,000 rpm for 5 minutes and then 0.5 parts by weight of residual LiFePO$_4$ particles were added thereto and then treated at 5,000 rpm to prepare a positive active material in which a coating layer including LiFePO$_4$ was formed on an Li[Ni$_{0.85}$Co$_{0.10}$Mn$_{0.05}$]O$_2$ core. The coating layer was a continuous coating layer.

Comparative Example 6: Manufacturing a Simply Mixed Positive Active Material 100 parts by weight of the Li[N$_{0.85}$Co$_{0.10}$Mn$_{0.05}$]O$_2$ powder having an average diameter of 6 μm manufactured in Manufacturing Example 1 and 5 parts by weight of LiFePO$_4$ particles having an average diameter of 200 nm were mixed in a stirrer for 5 minutes at 200 rpm.

Comparative Example 7: Preparing a Positive Active Material in Which an LiFePO$_4$ Coating Layer Having a Large Average Diameter is Formed on a Core The Li[Ni$_{0.85}$Co$_{0.10}$Mn$_{0.05}$]O$_2$ powder having an average diameter of 6 μm manufactured in Manufacturing Example 1 and LiFePO$_4$ particles having an average diameter of 2 μm were prepared. In a dry coating apparatus (Hosokawa Micron Corporation, Japan, Mechanofusion device, Nobilta-mini), 100 parts by weight of the Li[Ni$_{0.85}$Co$_{0.10}$Mn$_{0.05}$]O$_2$ powder and 1 part by weight of the LiFePO$_4$ particles were added and then treated at 3,000 rpm for 5 minutes to prepare a positive active material in which a coating layer including LiFePO$_4$ was formed on an Li[Ni$_{0.85}$Co$_{0.10}$Mn$_{0.05}$]O$_2$ core.

Evaluation Example 1: SEM Image Analysis of a Positive Active Material

FIGS. 3A to 3C are scanning electron microscope (SEM) images of the positive active materials manufactured in Examples 2 to 4, measured at 80,000×. As shown in FIGS. 3A to 3C, a coating layer in which particles are discontinuously coated is formed on a surface of the positive active material.

Figure 4A:
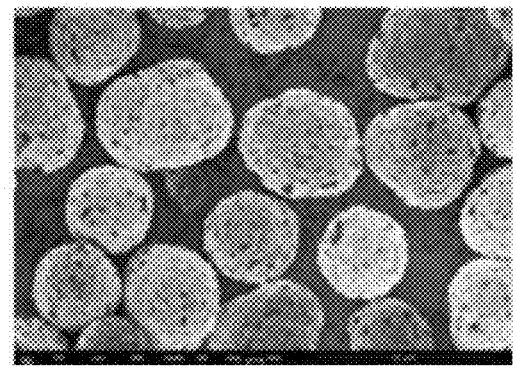
FIG. 4A is a scanning electron microscope (SEM) image of the positive active material manufactured in Example 2, measured at 10,000×.
Figure 4B:
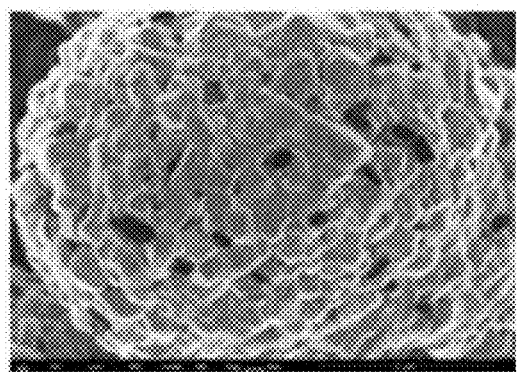
FIG. 4B is a scanning electron microscope (SEM) image of the positive active material manufactured in Example 2, measured at 50,000×.
Figure 5A:
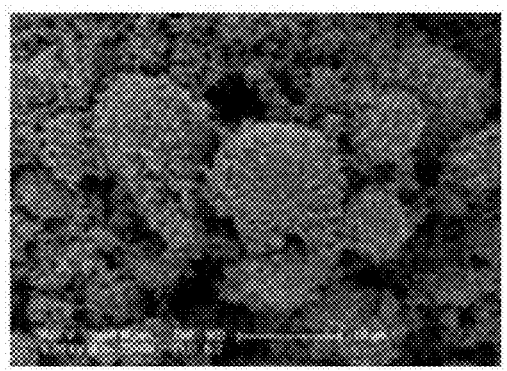
FIG. 5A is a scanning electron microscope (SEM) image of the positive active material manufactured in Comparative Example 5, measured at 2,500×.
Figure 5B:
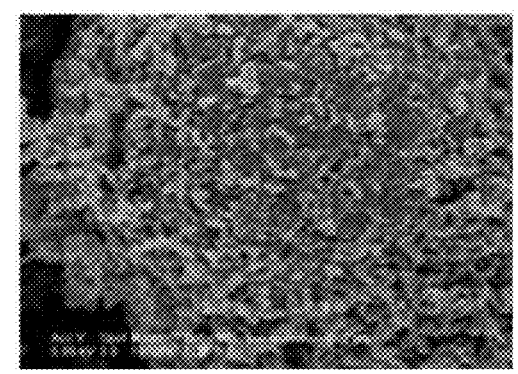
FIG. 5B is a scanning electron microscope (SEM) image of the positive active material manufactured in Comparative Example 5, measured at 10,000×.

To compare surfaces of a positive active material having an island-type discontinuous coating layer and a positive active material having a continuous coating layer, SEM images of Example 2 are shown in FIG. 4A (measured at 10,000×) and FIG. 4B (measured at 50,000×), and SEM images of Comparative Example 5 are shown in FIG. 5A (measured at 2,500×) and FIG. 5b (measured at 10,000×).

As shown in FIGS. 4A and 4B, a positive active material having an island-type discontinuous coating layer was manufactured through the dry coating process and as shown in FIGS. 5A and 5B, a positive active material having a continuous coating layer was formed through the process in Comparative Example 5.

Manufacturing a Positive Electrode and a Lithium Battery—Coin Half Cell

Example 5: Preparing a Positive Electrode

The positive active material manufactured in Example 4, polyvinylidene fluoride (PVdF) as a binder, and carbonaceous conductor (Denka Black) as a conductor were mixed at a weight ratio of 90:5:5 and N-methyl pyrrolidone was added in an amount of 60 wt % of solid to adjust viscosity, to thereby manufacture a positive active material composition.

A coating of the positive active material composition having a thickness of 40 μm was formed on an aluminum current collector having a thickness of 15 μm. The current collector on which the coating of the slurry was formed was dried at room temperature, dried again at a temperature of 120° C., and then rolled and punched (to prepare a positive electrode for use in a coin cell.

Manufacturing a Lithium Secondary Battery

The positive electrode, a lithium metal as a counter electrode, and a propylene separator having a thickness of 14 μm were used and an electrolyte was injected therein and then pressed to manufacture a 2032 standard coin cell. In this regard, the electrolyte was a solution in which LiPF$_6$ was dissolved to a concentration of 1.10 M in a mixture solution of ethylene carbonate (EC), diethyl carbonate (DEC), and a fluoroethylene carbonate (FEC) (a volume ratio of 5:70:25 of EC:DEC:FEC).

Comparative Examples 8 to 10

A lithium secondary battery was manufactured in the same manner as in Example 5, except that the positive active materials manufactured in Comparative Examples 1 to 3 were used respectively.

Manufacturing a Positive Electrode, a Negative Electrode, and a Lithium Battery Coin Full Cell Example 6: Manufacturing a Positive Electrode A positive electrode was manufactured in the same manner as in Example 5, except that the positive active material manufactured in Example 1 was used.

Manufacturing a Negative Electrode

Graphite particles as a negative active material, and polyvinylidene fluoride (PVdF) as a binder were mixed at a weight ratio of 95:5, and N-methyl pyrrolidone as a solvent was added in an amount of 60 wt % of solid to adjust viscosity of the mixture, to thereby manufacture a negative active material composition.

A copper current collector having a thickness of 14 μm was coated with the negative active material composition in a thickness of 40 μm. The current collector on which the slurry was coated was dried at room temperature, dried again at a temperature of 120° C., and then rolled and punched to prepare a negative electrode to be used in a coin cell.

Manufacturing a Lithium Secondary Battery

The positive electrode, the negative electrode, and a polypropylene separator having a thickness of 14 μm were used, and an electrolyte was injected therein and then pressed to manufacture a 2032 standard coin cell. In this regard, the electrolyte was a solution in which $LiPF_6$ was dissolved in a concentration of 1.10 M in a mixture solution of ethylene carbonate (EC), diethyl carbonate (DEC), and a fluoroethylene carbonate (FEC) (a volume ratio of 5:70:25 of EC:DEC:FEC).

Examples 7 to 9

A positive electrode, a negative electrode, and a lithium secondary battery were manufactured in the same manner as in Example 6, except that the positive active materials manufactured in Examples 2 to 4 were respectively used.

Comparative Examples 11 to 15

A positive electrode, a negative electrode, and a lithium secondary battery were manufactured in the same manner as in Example 6, except that the positive active materials manufactured in Comparative Examples 1 and 4 to 7 were respectively used.

Evaluation Example 2: Evaluation of Lifespan Properties

The coin cells manufactured in Examples 6-9 and Comparative Examples 11-15 were charged at a constant current of 0.1 C rate and at a temperature of 25° C. until voltage reached 4.3 V. Then, the coin cells were discharged at a constant current of 0.1 C until voltage reached 2.8 V (formation process).

Then, the coin cells were charged at a constant current of 0.2 C rate until voltage reached 4.3 V and then the coin cells were charged at a constant voltage until current reached 0.05 C while maintaining the voltage of 4.3 V. Thereafter, the coin cells were discharged at a constant current of 0.2 C until voltage reached 2.8 V (rating process).

Lithium batteries to which the formation rating process was applied were charged at a constant current of 0.5 C rate and at a temperature of 25° C. until voltage reached 4.3 V, and then the lithium batteries were charged at a constant voltage until current reached 0.05 C while maintaining the voltage of 4.3 V. Then, a cycle including discharging the lithium batteries at a constant current of 0.5 C until voltage reached 3.0 V was repeated 50 or 200 times.

The lifespan properties were measured as capacity retention rates and are shown in [Table 1] to [Table 5]. In this regard, the capacity retention rates are defined by Equation 1 below.

Capacity retention rate [%]=[discharge capacity in each cycle/discharge capacity in a $1^{st}$ cycle]× 100    Equation 1

TABLE 1

Capacity retention rate according to an amount of nickel - coin half cell

| | Capacity retention rate after 10 cycles (%) | Capacity retention rate after 30 cycles (%) | Capacity retention rate after 50 cycles (%) |
|---|---|---|---|
| Example 5 | 99.1 | 97.1 | 91.7 |
| Comparative Example 8 | 99.0 | 90.0 | 37.5 |
| Comparative Example 9 | 98.2 | 92.8 | 78.7 |
| Comparative Example 10 | 98.1 | 93.5 | 52.0 |

As shown in Table 1, the lithium battery (Example 5) including a positive active material in which a core including 85 mole % of nickel based on a total mole of metal atoms except lithium in a lithium nickel composite oxide was coated with $LiFePO_4$ showed better capacity retention rates when compared with the lithium batteries (Comparative Example 8 and Comparative Example 10) including a positive active material in which a coating layer was not formed on a core and a lithium battery (Comparative Example 9) including a positive active material in which a core including 50 mole % of nickel was coated with $LiFePO_4$. Accordingly, when the amount of nickel based on the total mole of metal atoms except lithium in a lithium nickel composite oxide is above a certain level, improvements in structural stability due to the coating layer including $LiFePO_4$ may be maximized.

TABLE 2

Capacity retention rate according to an amount of a coating layer - coin full cell

| | Capacity retention rate (%) after 100 cycle | Capacity retention rate (%) after 200 cycles |
|---|---|---|
| Comparative Example 11 | 95.9 | 92.8 |
| Comparative Example 12 | 91.1 | 87.4 |
| Example 6 | 98.5 | 96.5 |
| Example 7 | 99.8 | 98.3 |
| Example 8 | 98.0 | 96.0 |
| Example 9 | 96.2 | 94.4 |

As shown in Table 2, the lithium batteries (Examples 6-9) including a positive active material in which a core is coated with a suitable amount of $LiFePO_4$ showed better capacity retention rates when compared with the lithium batteries (Comparative Examples 11 and 12) including a positive active material that is not coated. Also, the lithium battery (Comparative Example 12) including a positive active material in which a core is coated with an excessive amount of $LiFePO_4$ showed reduced capacity retention rates because excessive $LiFePO_4$ acted as a resistor.

TABLE 3

Capacity retention rate according to a shape of a coating layer - coin full cell

| | Capacity retention rate (%) after 100 cycle | Capacity retention rate (%) after 200 cycles |
|---|---|---|
| Example 7 | 99.8 | 98.3 |
| Comparative Example 13 | 98.0 | 96.2 |

As shown in Table 3, the lithium battery (Example 7) including a positive active material having an island-type discontinuous coating layer showed better lifespan properties when compared with the lithium battery (Comparative Example 13) including a positive active material having a continuous coating layer. This is because the island-type discontinuous coating layer has better electrical conductivity between active materials and transfer of Li ions than the continuous coating layer.

TABLE 4

Comparing capacity retention rates of a simple mixture and a dry coating method - coin full cell

| | Capacity retention rate after 10 cycles (%) | Capacity retention rate after 50 cycles (%) | Capacity retention rate after 100 cycles (%) | Capacity retention rate after 200 cycles (%) |
|---|---|---|---|---|
| Example 9 | 100 | 97.9 | 96.2 | 94.4 |
| Comparative Example 14 | 98.2 | 96.4 | 92.1 | 83.2 |

As shown in Table 4, the lithium battery (Example 9) including a positive active material in which a core is dry coated with $LiFePO_4$ showed excellent capacity retention rates than the lithium battery (Comparative Example 14) including a positive active material in which $LiFePO_4$ was simply mixed. This is because the $LiFePO_4$ coating layer acts as a protective layer of the core to prevent a side reaction between the core and an electrolyte, but when $LiFePO_4$ is simply mixed with the positive active material, a side reaction between the core and an electrolyte may not be effectively prevented.

TABLE 5

Capacity retention rate according to size of $LiFePO_4$ particles - coin full cell

| | Capacity retention rate after 100 cycles (%) | Capacity retention rate after 200 cycles (%) |
|---|---|---|
| Example 7 | 99.8 | 98.3 |
| Comparative Example 15 | 96.4 | 94.2 |

As shown in Table 5, the positive active material of Comparative Example 15 failed to show improvements in capacity retention rate. This is because the positive active material that is dry coated with $LiFePO_4$ having an average diameter of 2 μm had a large particle size, such that the island-type discontinuous coating layer may not be formed on the core.

As described above, according to the one or more of the above embodiments of the present disclosure, a positive active material may include an island-type discontinuous coating layer including an olivine-type phosphate compound on a core surface including a lithium nickel composite oxide to improve structural stability. Also, the coating layer may prevent a side reaction with an electrolyte. Accordingly, lifespan properties of a lithium battery including the positive active material may be improved.

It should be understood that the exemplary embodiments described therein should be considered in a descriptive sense only and not for purposes of limitation. Descriptions of features or aspects within each embodiment should typically be considered as available for other similar features or aspects in other embodiments.

In the present disclosure, the terms "Example," "Comparative Example," "Manufacturing Example," "Comparative Manufacturing Example" and "Evaluation Example" are used arbitrarily to simply identify a particular example or experimentation and should not be interpreted as admission of prior art. While one or more embodiments of the present disclosure have been described with reference to the figures, it will be understood by those of ordinary skill in the art that various changes in form and details may be made therein without departing from the spirit and scope of the present invention as defined by the following claims.

What is claimed is:

1. A positive active material comprising:
   a core comprising a lithium nickel composite oxide represented by Formula 1:

$$Li_a(Ni_xM_y'M_z'')O_2 \quad \text{Formula 1}$$

wherein M' is at least one element selected from the group consisting of Co, Al, Mg, and Ti and M'' is at least one element selected from the group consisting of Ca, Sr, Fe, Mn, Cu, Zn, Y, Zr, Nb, and B (boron), wherein $0<a\le1$, $0.7\le x\le1$, $0\le y\le0.3$, $0\le z\le0.3$, and $x+y+z=1$; and
   a coating layer formed on the core,
   wherein the coating layer comprises an olivine-type phosphate compound and is an island type discontinuous coating layer,
   wherein the olivine-type phosphate compound is represented by Formula 3:

$$LiMPO_4 \quad \text{Formula 3}$$

wherein M is at least one element selected from Fe, Mn, Ni, Co, and V,
   wherein the amount of nickel in the lithium nickel composite oxide is about 70 mole % to about 85 mole % based on the total mole of metal atoms except lithium in the lithium nickel composite oxide, and an amount of the coating layer is about 0.1 parts by weight to about 10 parts by weight, based on 100 parts by weight of the core.

2. The positive active material of claim 1, wherein the lithium nickel composite oxide is represented by Formula 2:

$$Li_a(Ni_xCo_yMn_z)O_2 \quad \text{Formula 2}$$

wherein, $0<a\le1$, $0.7\le x\le1$, $0\le y\le0.3$, $0\le z\le0.3$, and $x+y+z=1$.

3. The positive active material of claim 1, wherein the olivine-type phosphate compound is represented by Formula 3:

$$LiMPO_4 \quad \text{Formula 3}$$

wherein M is at least one element selected from Fe and V.

4. The positive active material of claim 3, wherein the olivine-type phosphate compound is $LiFePO_4$.

5. The positive active material of claim 1, wherein the core is a one-body particle.

6. The positive active material of claim 1, wherein the core is a secondary particle formed by aggregation of primary particles.

7. The positive active material of claim 1, wherein an average diameter of the core is about 1 μm to about 100 μm.

8. The positive active material of claim 1, wherein an average diameter of the core is about 3 μm to about 50 μm.

9. The positive active material of claim 1, wherein an average diameter of particles of the olivine-type phosphate compound is about 10 nm to about 1 μm.

10. The positive active material of claim 1, wherein an amount of the coating layer is about 0.5 parts by weight to about 5 parts by weight, based on 100 parts by weight of the core.

11. A positive electrode comprising the positive active material of claim 1; and a current collector.

12. A lithium battery comprising the positive electrode according to claim 11; and a negative electrode.

13. A method of manufacturing the positive active material of claim 1, the method comprising:
   providing the core comprising the lithium nickel composite oxide; and
   performing a dry coating of nanoparticles comprising the olivine-type phosphate compound on the core to form an island-type discontinuous coating layer.

14. The method of claim 13, wherein the dry coating is performed by using a mechanofusion method, a planetary ball mill method, a low rotation ball mill method, a high rotation ball mill method, or a hybridization method.

15. The method of claim 13, wherein the dry coating is performed at a rotation speed of about 500 rpm to about 7,000 rpm.

16. The method of claim 13, wherein a separate heat treatment process is not performed after forming of the coating layer.

* * * * *